(12) United States Patent  
Lin et al.

(10) Patent No.: US 8,248,368 B2
(45) Date of Patent: Aug. 21, 2012

(54) SILENT MOUSE

(75) Inventors: Yin-Yu Lin, Taipei (TW); Yen-Bo Lai, Taipei (TW); Ming-Yuan Chen, Taipei (TW); Shu-I Chen, Taipei (TW)

(73) Assignee: Giga-Byte Technology Co., Ltd, Hsin-Tien (TW)

( * ) Notice: Subject to any disclaimer, the term of this patent is extended or adjusted under 35 U.S.C. 154(b) by 349 days.

(21) Appl. No.: 12/629,717

(22) Filed: Dec. 2, 2009

(65) Prior Publication Data

US 2010/0117964 A1 May 13, 2010

(51) Int. Cl.
*G06F 3/033* (2006.01)
(52) U.S. Cl. .................................. 345/163; 345/167
(58) Field of Classification Search .......... None
See application file for complete search history.

(56) References Cited

U.S. PATENT DOCUMENTS

| 4,797,665 | A | | 1/1989 | Ida et al. |
| 5,406,456 | A | * | 4/1995 | Hsu ................................ 361/752 |
| 5,886,685 | A | * | 3/1999 | Best ............................... 345/163 |
| 6,368,693 | B1 | * | 4/2002 | Livingstone et al. ......... 428/64.1 |
| 6,417,843 | B1 | * | 7/2002 | Stephens et al. .............. 345/167 |
| 2004/0150620 | A1 | * | 8/2004 | Tsen ............................. 345/163 |

* cited by examiner

*Primary Examiner* — Van Chow
(74) *Attorney, Agent, or Firm* — Chun-Ming Shih

(57) ABSTRACT

A computer mouse includes a casing, a skidding pad and a cushion member. The casing has a bottom surface and a side surface adjacent to a peripheral of the bottom surface. The skidding pad is applied on the bottom surface of the casing for sliding upon a working surface. The cushion member is formed at a corner defined between the bottom surface and the side surface of the casing. Additionally, when the computer mouse is stand still on the working surface, only the skidding pad is in contact with the working surface.

7 Claims, 6 Drawing Sheets

SILENT MOUSE

BACKGROUND OF INVENTION

1. Field of Invention

This invention relates to a silent mouse for a computer system and more particularly to a silent mouse, which generates low noises when hit against a desktop surface.

2. Related Prior Art

Several types of silent mice are known in the art. The most common type of silent mice is configured to stop clicking noises generated whenever the click buttons are engaged by the user. These clicking noises are a source of distraction and sometimes irritation when others are near, such as at home or in offices where silence may be necessary or where others are also using computers. Thus, this type of silent mice could be very useful in large offices to stop annoying clicks, in libraries where silence is necessary, in classrooms where students are trying to concentrate, or at home where at night or during the day excessive clicking becomes annoying. However, mouse noises are generated not just from the clicking.

Another type of silent mice is configured to reduce the noise generated when the mice are slid during use. One such mouse is described in U.S. Pat. No. 4,797,665 and includes a resilient cushion attached to the bottom of its casing and a high-durability, low-friction slide sheet attached to the bottom of the cushion. By this way, the mouse could easily slide on a desktop surface and does not generate noise when slid. However, there are other mouse noises generated during use. For example, when the mouse is lifted up and down upon a desktop surface for displacement, noises are generated due to the colliding between the mouse and the desktop surface. This possible mouse noises exist, but have not heretofore been dissolved yet.

SUMMARY OF INVENTION

According to the study by the inventors, most of the noises are generated because of the colliding between the mouse and the desktop surface, especially when the bottom periphery of the mouse hits against the desktop surface. Therefore, a new type of silent mice is provided to reduce the hitting noise.

According to this invention, the computer mouse includes a casing, a skidding pad and a cushion member. The skidding pad has superior wear resistance and is applied on a bottom surface of the casing for sliding upon a working surface or a desktop surface. The cushion member is formed at a corner defined between the bottom surface of the casing and an adjacent side surface of the casing. When the computer mouse stands still on the working surface, only the skidding pad stays in contact with the working surface. Note that the cushion member may be made of a resilient material, such as rubber or silicone, in order to reduce the impact of the mouse on the working surface, and thereby prevent the generation of noises.

The construction of mouse as described above is thus far largely conventional. In particular, in virtue of the cushion member covering the bottom periphery of the casing, this configuration is advantageously utilized to reduce the hitting noise generated when the mouse hits the working surface during use.

The present invention and the advantages thereof will become more apparent upon consideration of the following detailed description when taken in conjunction with the accompanying drawings.

BRIEF DESCRIPTION OF DRAWINGS

The invention is illustrated by the accompanying drawings in which corresponding parts are identified by the same numerals and in which.

DETAILED DESCRIPTION OF EMBODIMENTS

Figure 1:
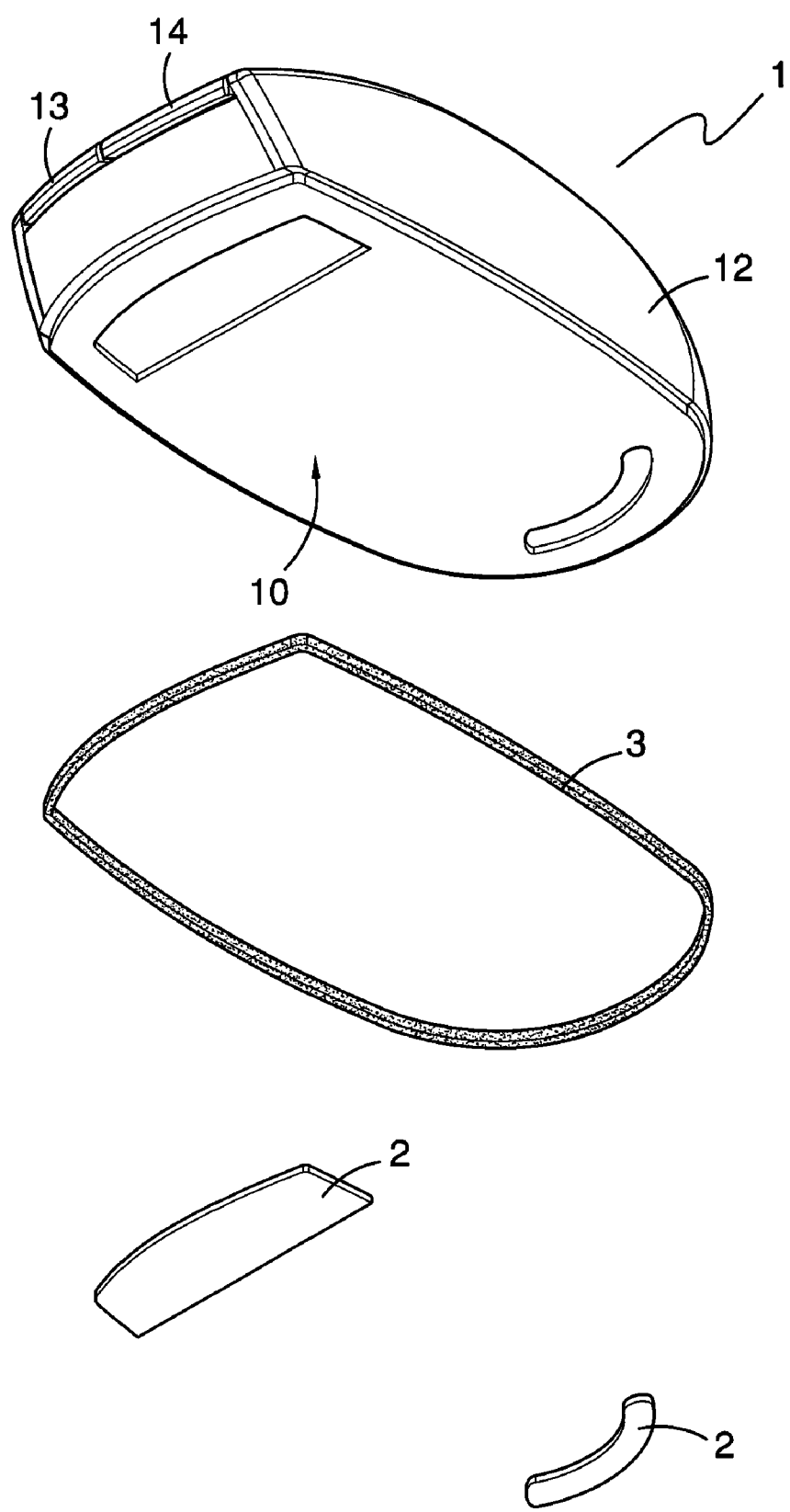
FIG. 1 is an exploded view of a computer mouse in accordance with one embodiment of the invention.
Figure 2:
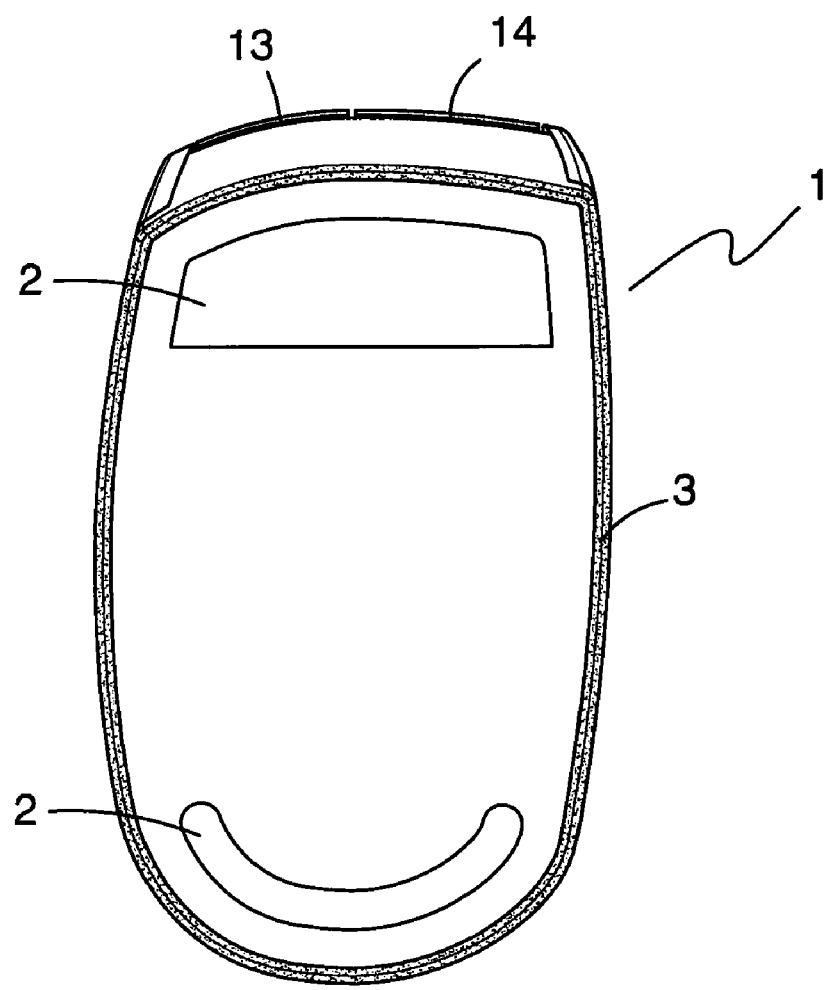
FIG. 2 is a bottom view of the computer mouse shown in FIG. 1.
Figure 3:
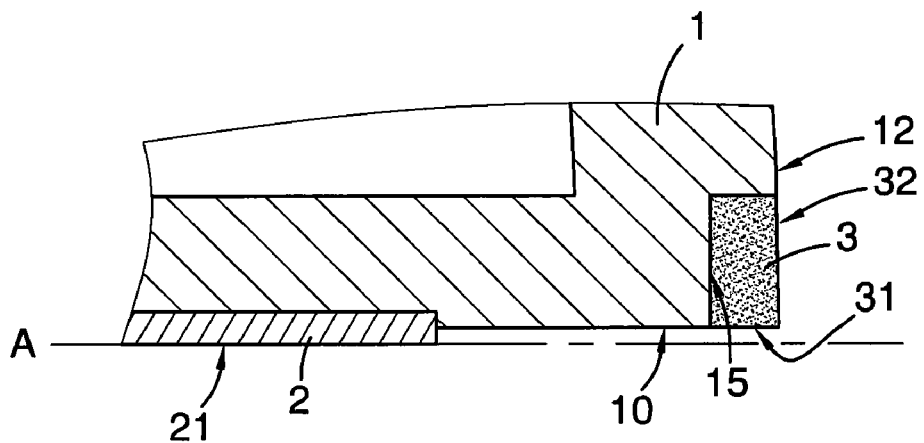
FIG. 3 is a fragmentary enlarged view of the computer mouse shown in FIG. 1.

With reference to FIG. 1, a silent computer mouse is shown having a casing 1, at least one skidding pad 2 and a cushion member 3. FIG. 2 is a bottom view of the assembled silent mouse. FIG. 3 is a partial enlarged view of the silent mouse placed on a working surface (A).

Basically, on top of the casing 1 is a roller (not shown) which implements scrolling, a right button 13, a left button 14, etc. The casing 10 has a bottom surface 10 and a side surface 12 adjacent to a peripheral of the bottom surface 10. The skidding pad 2 is applied on the bottom surface 10 of the casing 1 for sliding upon the working surface (A).

With superior wear resistance, the skidding pad 2 is made of rigid material for sliding upon the working surface (A). In contrast, the cushion member 3 is made of resilient material, such as rubber or silicone, and is formed at a corner defined between the bottom surface 10 and the adjacent side surface 12 of the casing 1, as best seen in FIG. 3.

FIGS. 4 to 12 are views similar to FIG. 3 to show other examples of the cushion member 3 together with the corresponding casings 1. The common features in those examples are that the cushion member 3 is located at the corner of the casing 1, and the cushion member 3 may be project beyond the bottom surface 10 but not beyond that of the skidding pad 2. That is, when the silent mouse is placed on the working surface (A), only the skidding pad 2 is in contact with the working surface (A), not the cushion member 3. It is clear that the silent mouse can smoothly slide upon the working surface (A) if the cushion member 3 is arranged not in touch with the working surface (A).

Specifically, the casing 1 defines a recess 15 in the corner for receiving the cushion member 3. Referring back to FIG. 3, the cushion member 3 is integrally received in the recess 15 of the casing 1 with its bottom surface 31 and exterior side surface 32 flush with that of the casing 1.

Figure 4:
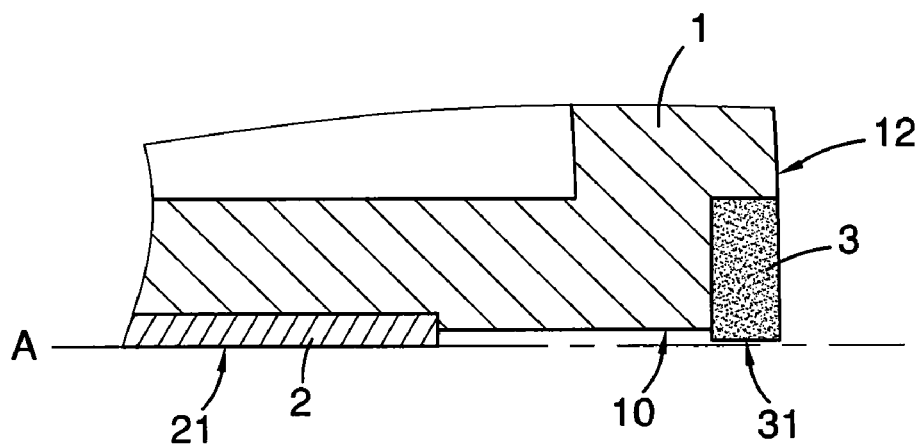
FIGS. 4 to 12 are similar to FIG. 3, showing that other types of cushion members with corresponding casings may be applied on this type of computer mice.

Similar to FIG. 3, FIG. 4 further illustrates that the cushion member 3 projects beyond the bottom surface 10 of the casing 1, but not that of the skidding pad 2. Therefore, when the silent mouse stands still, the cushion member 3 would still not touch the working surface (A).

Figure 5:
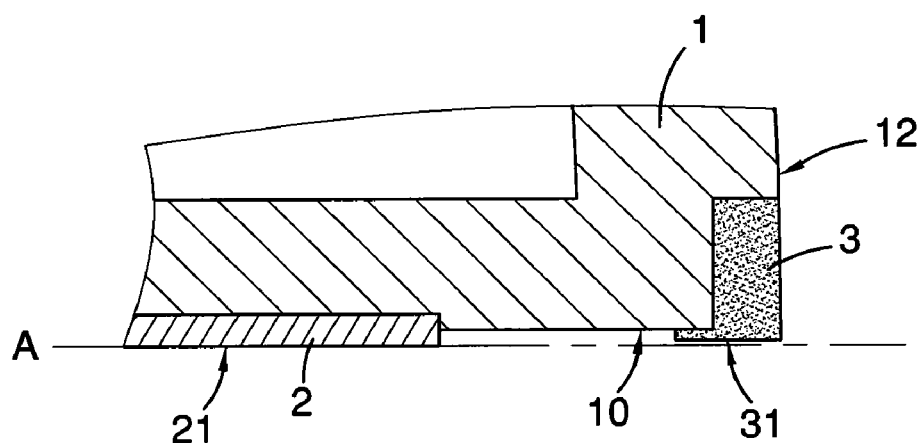

Similar to FIG. 4, FIG. 5 further illustrates that the cushion member 3 has an extension laterally extending from a lower portion thereof to partially cover the bottom surface 10 of the casing 1. Similarly, the cushion member 3 does not project beyond the bottom surface 21 of the skidding pad 2.

Figure 6:
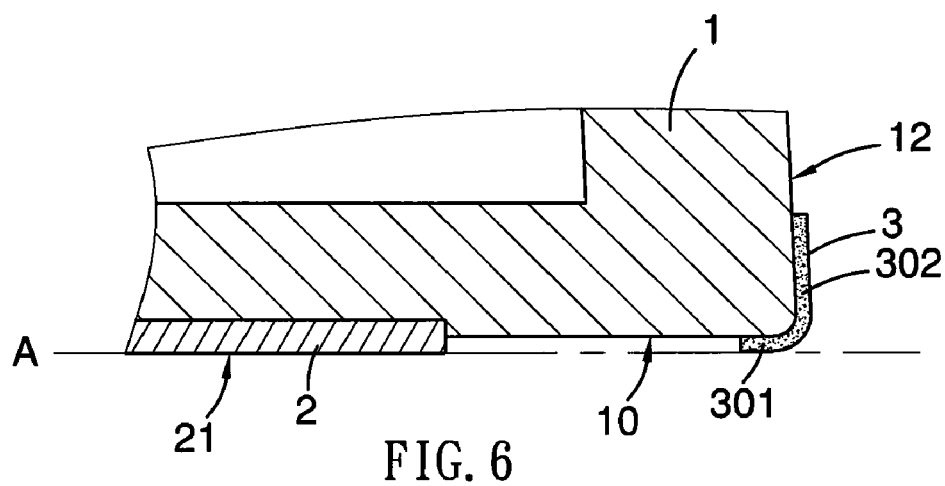

FIG. 6 illustrates that the cushion member 3 is directly adhered to the corner between the side surface 12 and the bottom surface 10 of the casing 1 with its lower horizontal portion 301 extending downwardly beyond the bottom surface 10 of the casing 1 and its upper vertical portion 302 extending laterally beyond the side surface 12 of the casing 1.

But still, the lower horizontal portion 301 of the cushion member 3 does not downwardly project beyond the bottom surface 21 of the skidding pad 2.

Figure 7:
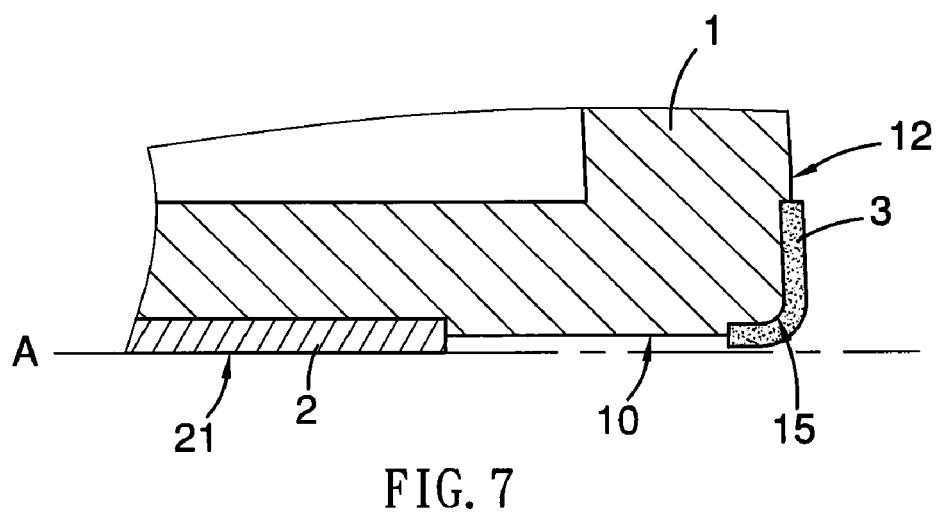

The silent mouse of FIG. 7 is similar to that of FIG. 6 except that the cushion member 3 of FIG. 7 is received a recess 15 in a corner surface of the casing 1.

Figure 8:
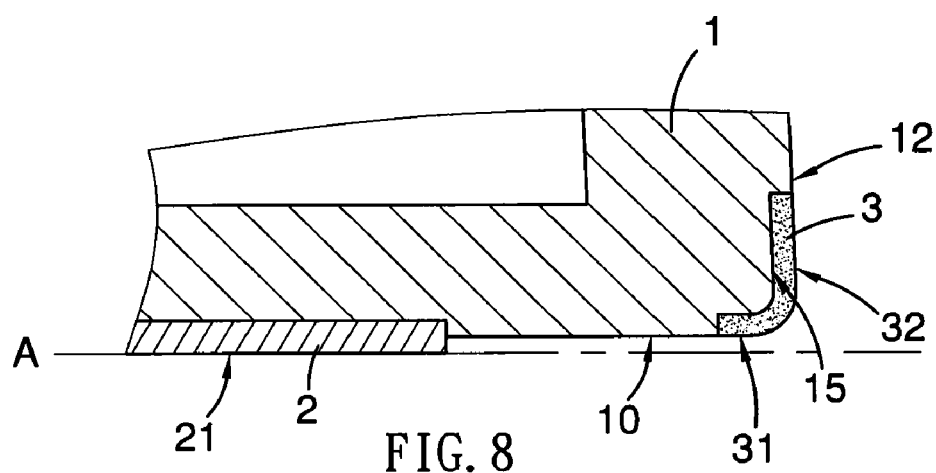

The silent mouse of FIG. 8 is similar to that of FIG. 7 except that the cushion member 3 of FIG. 8 is integrally received in the recess 15 of the casing 1 with its bottom surface 31 and its exterior side surface 32 flush with that of the casing 1.

Figure 9:
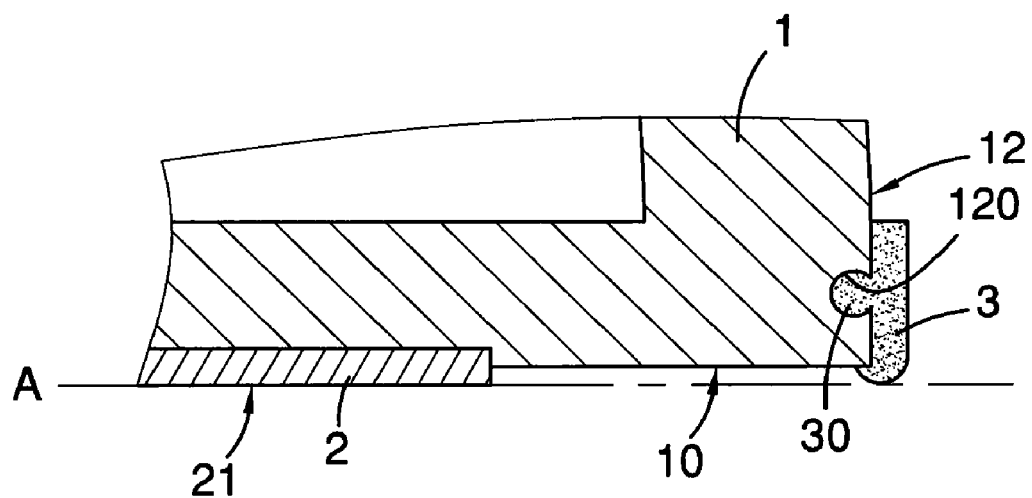

With reference to FIG. 9, the casing 1 defines a circular arc groove 120 in the side surface 12 thereof. The cushion member 3 is integrally formed with a circular arc extension 30 on a side thereof. The circular arc extension 30 of the cushion member 3 is lodged in the circular arc groove 120 of the casing 1. Additionally, the cushion member 3 extends downwardly beyond the bottom surface 10 of the casing 1 and laterally covers a part of the bottom surface 10. In a case where the cushion member 3 is made of a resilient material, the circular arc groove 120 of the cushion member 3 may be dimensioned in accordance with the size of the circular arc extension 30 in order to enable the circular arc extension 30 to be elastically pressed and forced into circular arc groove 120. Thus, it would be advantageous to fabricate and assemble the silent mouse in a cost effective way.

Figure 10:
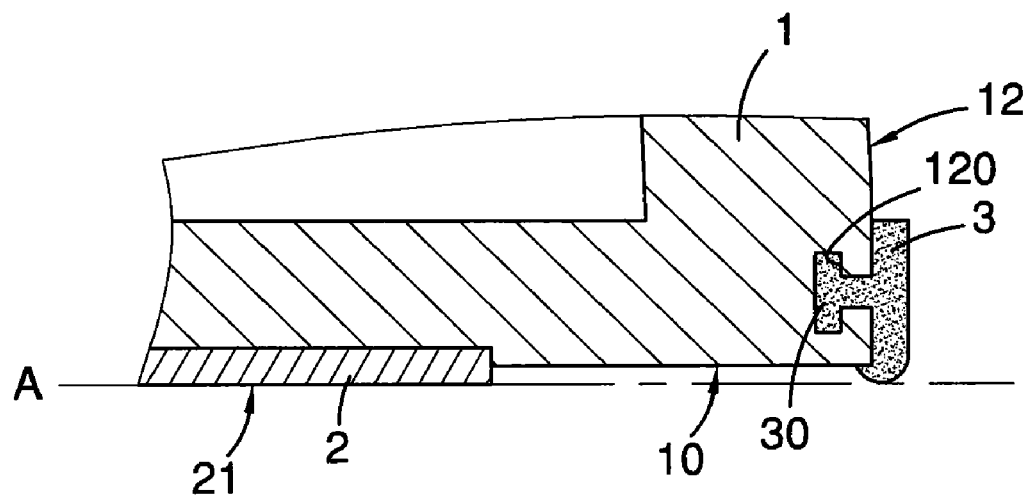

FIG. 10 is generally similar to FIG. 9, except that the cushion member 3 of FIG. 10 has a T-shaped extension 30 firmly lodged in a T-shaped groove 120 of the casing 1. If not breaking, the T-shaped extension 3 of the cushion member 3 is not possible to be removed from the T-shaped groove 120 of the casing 1. This kind of silent mouse may be formed by double injection molding. By this way, the cushion member 3 would not easily come off the casing 1.

Figure 11:
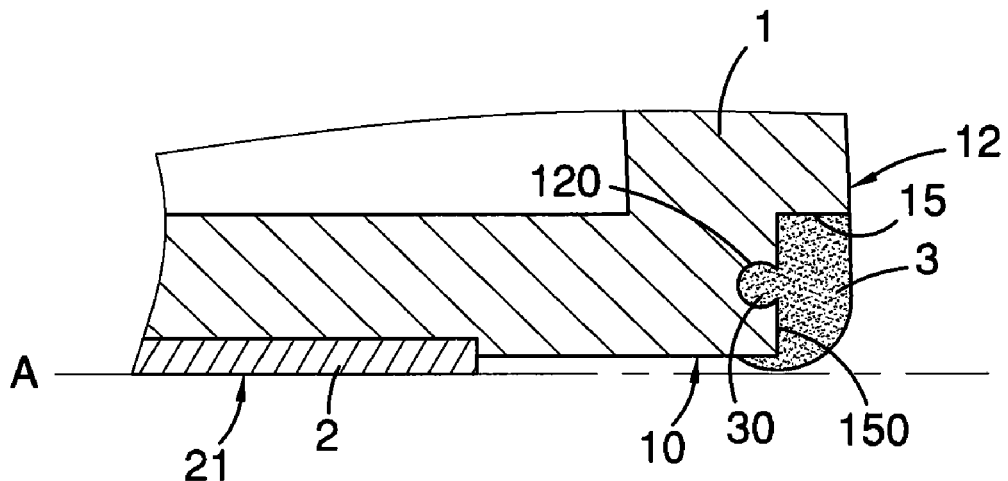

FIG. 11 is generally similar to FIG. 9, except that the cushion member 3 of FIG. 11 is received in a recess 15 at the corner between the side surface 12 and the bottom surface 10 of the casing 1. Further, the casing 1 further defines a circular arc groove 120 in a wall 150 of the recess 15. On the other hand, the cushion member 3 has a circular arc extension 30 laterally engaged in the circular arc groove 120 of the casing 1.

Figure 12:
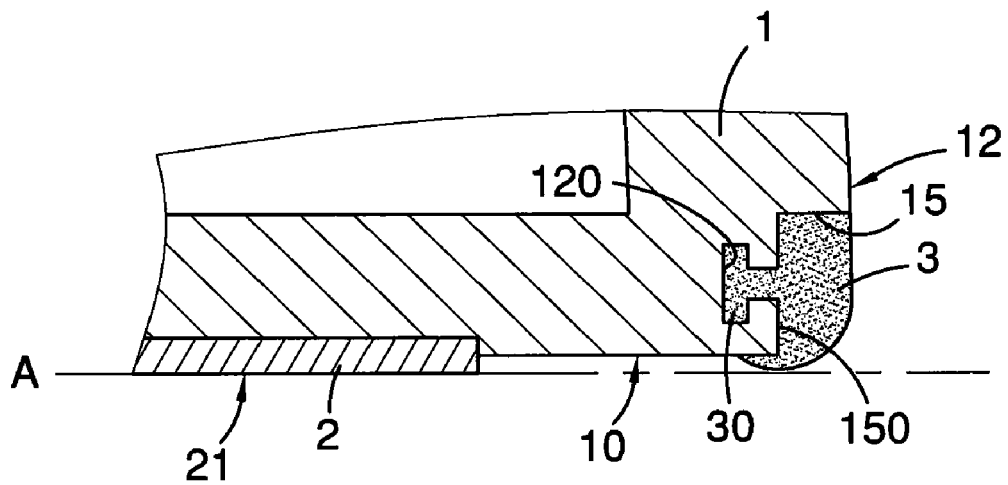

FIG. 12 is generally similar to FIG. 11, except that the cushion member 3 of FIG. 12 has a T-shaped extension 30 firmly lodged in a T-shaped groove 120 in a wall 150 of the casing 1. If not breaking, the T-shaped extension 3 of the cushion member 3 is not possible to be removed from the T-shaped groove 120 of the casing 1. This kind of silent mouse may be formed by double injection molding. By this way, the cushion member 3 would not easily come off the casing 1.

It will be appreciated that although a particular embodiment of the invention has been shown and described, modifications may be made. It is intended in the claims to cover such modifications which come within the spirit and scope of the invention.

The invention claimed is:

1. A computer mouse, comprising:
    a casing having a bottom surface and a side surface adjacent to a peripheral of the bottom surface, and the casing further defining a recess in a corner defined between the bottom surface and the side surface of the casing;
    a skidding pad applied on the bottom surface of the casing for sliding upon a working surface; and
    a cushion member received in the recess of the casing;
    wherein when the computer mouse stands still on the working surface, only the skidding pad is in contact with the working surface.

2. The computer mouse of claim 1 wherein the casing further defines a groove in a wall of the recess, and the cushion member has an extension laterally engaged in the groove of the casing.

3. The computer mouse of claim 2 wherein the extension of the cushion member is firmly fixed in the groove of the casing.

4. The computer mouse of claim 3 wherein the cushion member is made of a material selected from a group consisting of rubber and silicone.

5. The computer mouse of claim 1 wherein the cushion member has a bottom surface flush with that of the casing.

6. The computer mouse of claim 5 wherein the cushion member has an exterior side surface flush with the side surface of the casing.

7. The computer mouse of claim 1 wherein the cushion member protrudes beyond the bottom surface of the casing but not beyond that of the skidding pad.

* * * * *